(12) United States Patent
Lee

(10) Patent No.: US 9,007,437 B2
(45) Date of Patent: Apr. 14, 2015

(54) IMAGE PROCESSING APPARATUS AND METHOD

(75) Inventor: Seung Kyu Lee, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 808 days.

(21) Appl. No.: 13/029,738

(22) Filed: Feb. 17, 2011

(65) Prior Publication Data

US 2012/0026291 A1     Feb. 2, 2012

(30) Foreign Application Priority Data

Jul. 29, 2010   (KR) .................. 10-2010-0073664

(51) Int. Cl.
| | |
|---|---|
| *H04N 13/00* | (2006.01) |
| *H04N 13/02* | (2006.01) |
| *H04N 13/04* | (2006.01) |
| *G06K 9/00* | (2006.01) |
| *G06T 7/00* | (2006.01) |
| *G06T 11/00* | (2006.01) |

(52) U.S. Cl.
CPC ........ *H04N 13/0488* (2013.01); *H04N 13/0239* (2013.01); *H04N 13/0296* (2013.01); *H04N 13/0242* (2013.01); *G06T 7/0012* (2013.01); *G06T 11/006* (2013.01); *G06T 7/0081* (2013.01)

(58) Field of Classification Search
CPC .............. H04N 13/00; H04N 13/0239; H04N 13/0296; H04N 13/0497; H04N 13/0242
USPC ................ 348/42, 46; 600/443, 476; 382/131
See application file for complete search history.

(56) References Cited

U.S. PATENT DOCUMENTS

| | | | | |
|---|---|---|---|---|
| 6,503,199 | B1* | 1/2003 | Lennon ......................... | 600/443 |
| 2001/0040991 | A1* | 11/2001 | Asano et al. .................. | 382/128 |
| 2004/0125103 | A1* | 7/2004 | Kaufman et al. ............. | 345/419 |
| 2007/0201737 | A1* | 8/2007 | Cai ................ | 382/131 |
| 2007/0276269 | A1* | 11/2007 | Yun et al. ...................... | 600/504 |
| 2008/0240526 | A1* | 10/2008 | Suri et al. ...................... | 382/128 |
| 2008/0317198 | A1* | 12/2008 | Thornton ........................ | 378/18 |
| 2009/0030312 | A1* | 1/2009 | Hadjicostis ................... | 600/439 |
| 2009/0148024 | A1* | 6/2009 | Park .............................. | 382/134 |
| 2009/0270738 | A1* | 10/2009 | Izatt et al. ..................... | 600/476 |
| 2010/0195868 | A1* | 8/2010 | Lu ................ | 382/103 |
| 2011/0176713 | A1* | 7/2011 | Asaka ........................... | 382/128 |
| 2011/0176716 | A1* | 7/2011 | Kim et al. ..................... | 382/131 |
| 2011/0255761 | A1* | 10/2011 | O'Dell et al. ................. | 382/131 |
| 2013/0094732 | A1* | 4/2013 | Chabanas et al. ............. | 382/128 |

FOREIGN PATENT DOCUMENTS

| | | |
|---|---|---|
| KR | 100158417 | 8/1998 |
| KR | 100173250 | 10/1998 |
| KR | 10-2005-0094224 | 9/2005 |
| KR | 10-2006-0133676 | 12/2006 |
| KR | 10-2009-0092486 | 9/2009 |

* cited by examiner

*Primary Examiner* — Jamie Atala
*Assistant Examiner* — On S Mung
(74) *Attorney, Agent, or Firm* — Harness, Dickey & Pierce, P.L.C.

(57) ABSTRACT

Provided is an image processing apparatus and method thereof. The image processing apparatus may extract a three-dimensional (3D) bidirectional flow by analyzing data of an input object. The image processing apparatus may calculate a 3D volumetric center density of the input object based on the 3D bidirectional flow.

22 Claims, 8 Drawing Sheets

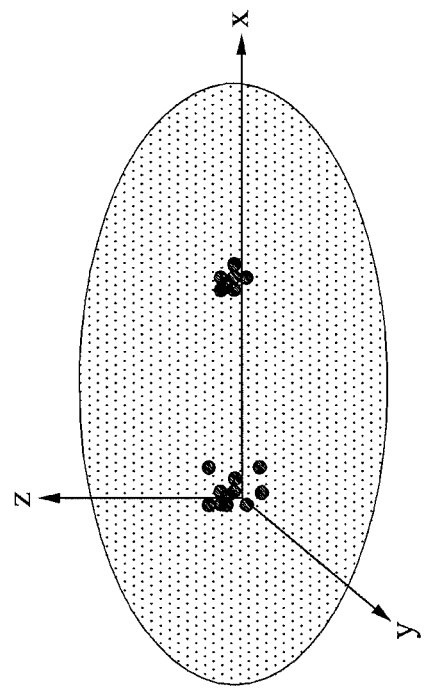
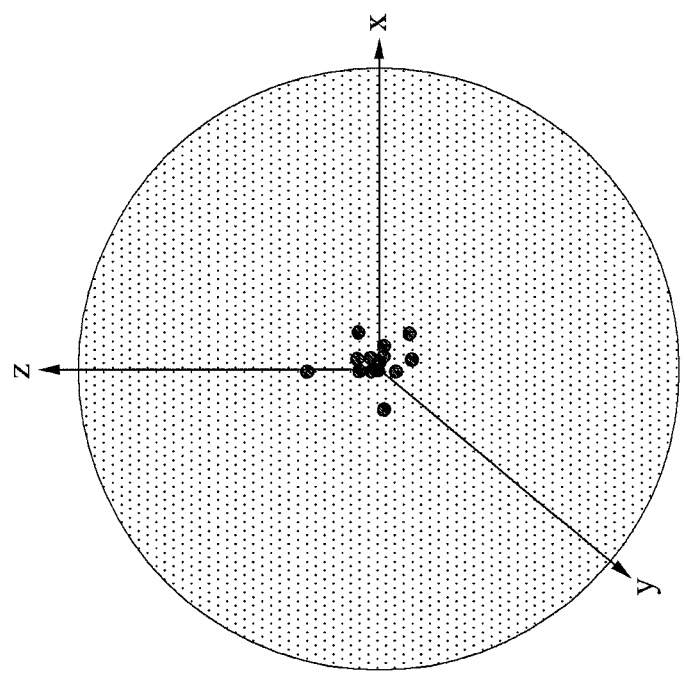
FIG. 5

IMAGE PROCESSING APPARATUS AND METHOD

CROSS-REFERENCE TO RELATED APPLICATIONS

This application claims the priority benefit of Korean Patent Application No. 10-2010-0073664, filed on Jul. 29, 2010, in the Korean Intellectual Property Office, the disclosure of which is incorporated herein by reference.

BACKGROUND

1. Field

Example embodiments relate to capturing and modeling of a three-dimensional (3D) object using a color camera, a depth camera, and the like, and, more particularly, to image processing of fitting a given model with acquired data for processing of 3D object information.

2. Description of the Related Art

When three-dimensional (3D) object data is given or provided, an image processing process of detecting a 3D volumetric of a particular shape from the given 3D object data may play an important role in an image processing field, an imaging field, and a variety of industrial engineering fields.

For example, a process of detecting an organ portion or a tumor portion from data acquired through a computed tomography (CT) scan may be performed by 3D volumetric detection and characterization.

However, without image reading or data calibration through a human being, it is difficult to quickly perform automatic volumetric center point search or object extraction from given 3D object data.

SUMMARY

The foregoing and/or other aspects are achieved by providing an image processing apparatus, including a bidirectional flow extractor to extract a three-dimensional (3D) bidirectional flow by analyzing data of an input object, and a volumetric center density calculator to calculate a 3D volumetric center density of the input object based on the 3D bidirectional flow.

The bidirectional flow extractor may extract a two-dimensional (2D) bidirectional flow from each of at least two planes among a plurality of planes dividing the input object, with respect to the data of the input object, and extracts the 3D bidirectional flow of the input object using the 2D bidirectional flow.

The bidirectional flow extractor may extract the 2D bidirectional flow by performing a polar transform with respect to at least two points, with respect to each of the at least two planes, and by performing a phase analysis on a polar transformed plane.

The phase analysis may correspond to a phase analysis using an angular discrete Fourier transform (DFT) scheme.

The bidirectional flow extractor may extract, as the 3D bidirectional flow, a straight light perpendicularly crossing an intersecting point of extracted 2D bidirectional flows.

The volumetric center density calculator may determine an interesting point of extracted 3D bidirectional flows as a center point of the input object, and may calculate a volumetric center density using the center point to generate a volumetric center density map.

The image processing apparatus may further include a density mode determiner to determine a density mode by analyzing the 3D volumetric center density of the input object.

The density mode may information regarding whether a distribution of the 3D volumetric center density corresponds to a signal mode or a dual mode.

The image processing apparatus may further include a object characteristic determiner to determine a characteristic of the input object based on the density mode.

When a distribution of the 3D volumetric center density corresponds to a single mode, the object characteristic determiner may determine the input object as a spherical shape to analyze a center point of a sphere as an object parameter. When the distribution of the 3D volumetric center density corresponds to a dual mode, the object characteristic determiner may determine the input object as an elliptical shape to analyze two foci and major axes as object parameters.

The foregoing and/or other aspects are achieved by providing an image processing method, including extracting a three-dimensional (3D) bidirectional flow by analyzing data of an input object, and calculating a 3D volumetric center density of the input The example embodiments may include an image processing apparatus and method that may accurately analyze, recognize, and track parameters of 2.5 dimensional (2.5D) or 3D spherical or elliptical volumetric data and thus, may enhance a performance of object modeling and interaction.

The example embodiments may include an image processing apparatus and method that may readily and accurately acquire a center point of a sphere, a direction of foci and major axes of an ellipsoid, and the like even though a shape of an object is atypical or partially visible and thus, may perform an accurate object characteristic analysis even though only partial surface information of an object model is known.

The example embodiments may include an image processing apparatus and method that may quickly and accurately detect an area having a particular 3D shape with respect to a large capacity of real-3D data containing photometry information such as a color or an intensity of each 3D voxel as well as simple geometry information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 5 illustrates a process of determining a center density mode of an extracted input object according to example embodiments;

DETAILED DESCRIPTION

Figure 1:
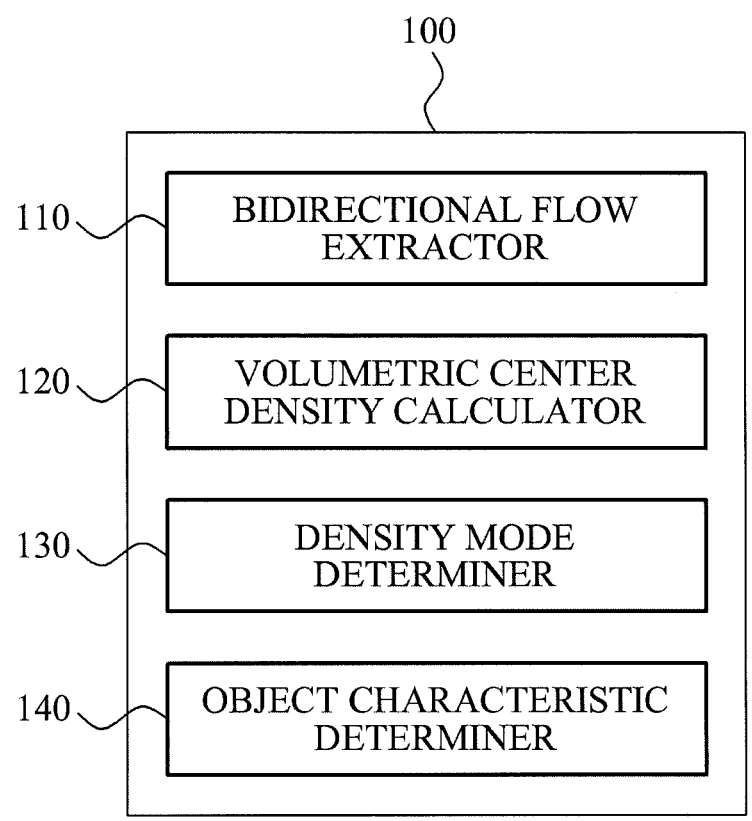
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

Referring to FIG. 1, the image processing apparatus 100 may include a bidirectional flow extractor 110, a volumetric center density calculator 120, a density mode determiner 130, and an object characteristic determiner 140.

The bidirectional flow extractor 110 may extract a plurality of three-dimensional (3D) bidirectional flows with respect to an input object.

When a 3D or 2.5D object is input, the bidirectional flow extractor 110 may analyze a slice of the input object that is cut by a plane crossing two points.

In the above process, a two-dimensional (2D) bidirectional flow detection process may be performed using phase analysis and frequency domain analysis of the slice, which will be further described with reference to FIG. 2.

The bidirectional flow extractor 110 may detect a 2D center point with respect to the slice, and may detect, as a 3D bidirectional flow, a perpendicular line crossing the 2D center point. The above process will be further described with reference to FIG. 3.

The volumetric center density calculator 120 may determine intersecting points of extracted 3D bidirectional flows as volumetric center points, using the extracted 3D bidirectional flows, and may express a density distribution of the volumetric center points as a volumetric center density (VCD) map.

A process of detecting, by the volumetric center density calculator 120, a 3D volumetric center point will be further described with reference to FIG. 3 and FIG. 4. The VCD map will be further described with reference to FIG. 5.

The density mode determiner 130 may determine whether the input object has a volume density distribution of a single mode or a volume density distribution of a dual mode based on the density distribution.

Based on the determined density mode, the object characteristic determiner 140 may characterize the input object by determining an object characteristic. For example, in the case of a sphere, a position of a center point and the like may be determined. In the case of an ellipsoid, foci and major axes and/or minor axes may be determined.

Figure 2:
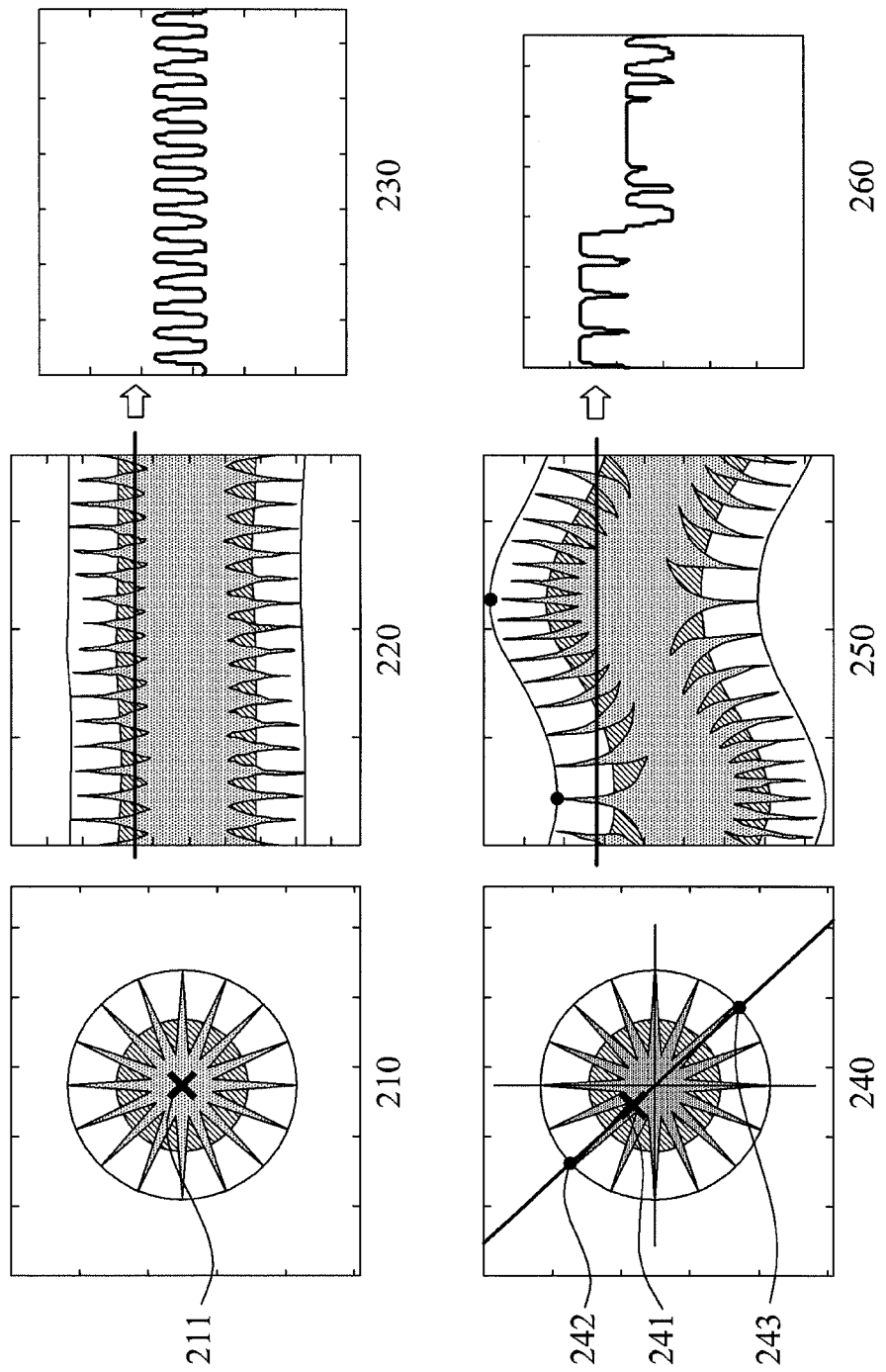
FIG. 2 illustrates a process of extracting a two-dimensional (2D) bidirectional flow from plane data according to example embodiments.

FIG. 2 illustrates a process of extracting a 2D bidirectional flow from plane data according to example embodiments.

A slice of a 3D or 2.5 input object that is cut by a plane characterized by at least two points of the input object may be a plane, for example, an image 210.

The bidirectional flow extractor 110 may select at least two points within an input object, and may acquire planar image data such as the image 210 using a plane characterized by the at least two points.

The planar image data may be used to obtain a volumetric center of the input object.

When a planar image in a predetermined shape is given, a variety of algorithms may be used to calculate a center point of a target included in the planar image by analyzing the planar image.

A predetermined point may be selected with respect to the planar image, and a polar phase analysis may be performed within the range of zero degree to 360 degrees based on the selected point.

For example, the bidirectional flow extractor 110 may select a predetermined point 211 within the image 210, and may perform phase analysis of the image 210 within the range of zero degree to 360 degrees by using the point 211 as a center point. Accordingly, an object 220 may be acquired.

Since the selected point 211 is close to a center of an area where data is present, instead of a space within the image 210, the image 220 where fluctuation barely exists may be acquired.

The bidirectional flow extractor 110 may perform again phase analysis along one straight line within the phase analyzed image 220, and may perform frequency domain analysis using a result graph 230 of the phase analysis.

The frequency domain analysis may be performed by angular discrete Fourier transform (DFT).

The phase analysis and frequency domain analysis may be understood through Equation 1 through Equation 3:

$$\phi_i(r) = \arctan\left(\frac{\text{Re}(P_{xi,yi}(r,2))}{\text{Im}(P_{xi,yi}(r,2))}\right) \quad \text{[Equation 1]}$$

$$\frac{\tan\Phi_i}{x_i + y_i\tan\Phi_i}y + \frac{1}{x_i + y_i\tan\Phi_i}x = 1 \quad \text{[Equation 2]}$$

$$C = \begin{pmatrix} x \\ y \end{pmatrix} = \begin{pmatrix} \dfrac{s_i x_i - s_j x_j + y_j - y_i}{s_i - s_j} \\ \dfrac{s_i s_j(x_i - x_j) + s_i y_j - s_j y_i}{s_i - s_j} \end{pmatrix} \quad \text{[Equation 3]}$$

where $s_i = -\dfrac{1}{\tan\Phi_i}$ and $s_j = -\dfrac{1}{\tan\Phi_j}$

As shown in the graph 230, a sinusodial component is dominant as a result of the frequency domain analysis. That is, a plurality of harmonics is not mixed and a single frequency is dominant in the graph 230.

The bidirectional flow extractor 110 may further select a point 241 in an image 240 in addition to the point 211. The bidirectional flow extractor 110 may perform phase analysis with respect to the point 241 through the same process, may perform phase analysis of a phase analyzed image 250 along the straight line, and may perform frequency domain analysis with respect to a result.

As shown in a graph 260, the result of the frequency domain analysis may include a large number of harmonics.

A point 242 within the image 240 corresponds to a bottom of a fluctuating wave within the image 250, and a point 243 corresponds to a top of the fluctuating wave within the image 250. A straight line crossing the point 242 corresponding to the bottom and the point 243 corresponding to the top may be determined within the image 240. The determined straight line may be determined as a 2D bidirectional flow.

The 2D bidirectional flow may cross a center point of an object portion excluding a space within the image 240.

When the above process is repeatedly performed with respect to selected different points, at least two 2D bidirectional flows may be extracted. An intersecting point of the extracted at least two 2D bidirectional flows may be determined as the center point of the object portion excluding the space of the image 240.

A process of extracting a 3D bidirectional flow and finding a center point of an input object by applying the above analysis to a 3D or 2.5D object will be described with reference to FIG. 3.

Figure 3:
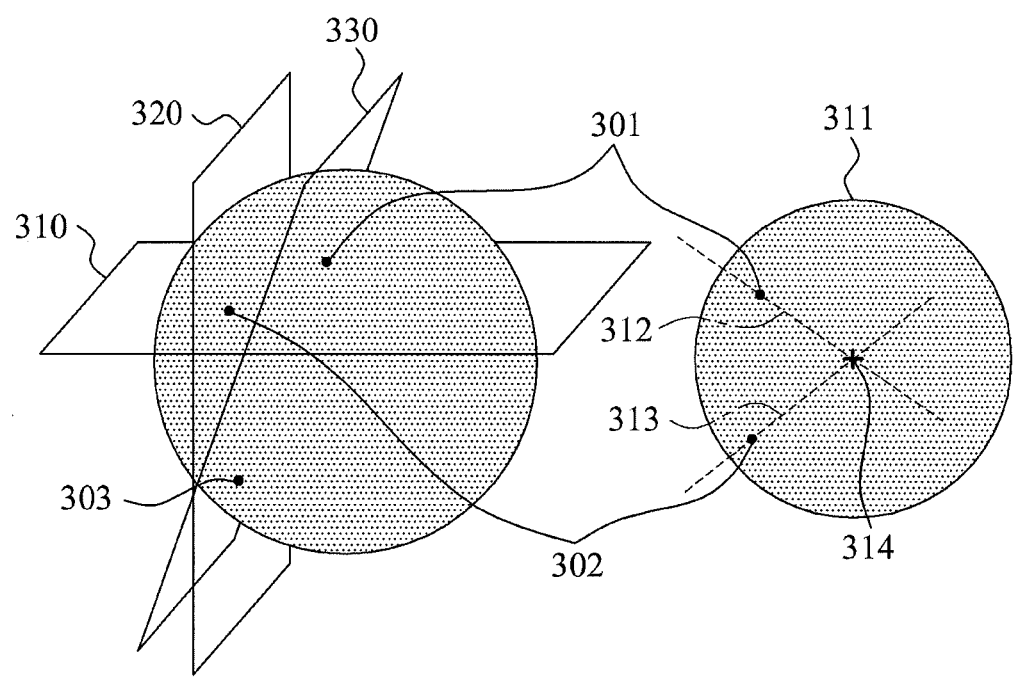
FIG. 3 illustrates a process of extracting a three-dimensional (3D) bidirectional flow from input object data according to example embodiments.

FIG. 3 illustrates a process of extracting a 3D bidirectional flow from input object data according to example embodiments.

The bidirectional flow extractor 110 of the image processing apparatus 100 may select a plurality of points within and/or outside an input object.

The bidirectional flow extractor 110 may select a plane 310 crossing points 301 and 302. The bidirectional flow extractor 110 may also select a plane 320 crossing points 302 and 303, and may select a plane 330 crossing the points 301 and 303.

A slice 311 of the input object cut by the plane 310 is shown on the right of FIG. 3.

The bidirectional flow extractor 110 may extract 2D bidirectional flows 312 and 313 by performing the process of FIG. 2 with respect to the slice 311, and may determine an intersecting point 314 of the extracted 2D bidirectional flows 312 and 313 as a center point of the slice 311.

The bidirectional flow extractor 110 may extract, as one 3D bidirectional flow of the input object, a straight line (not shown) perpendicularly crossing the intersecting point 314 that is the center point of the slice 311.

When the aforementioned 3D bidirectional flow extracting process is performed with respect to the planes 320 and 330, and the like, a plurality of 3D bidirectional flows may be acquired.

Figure 4:
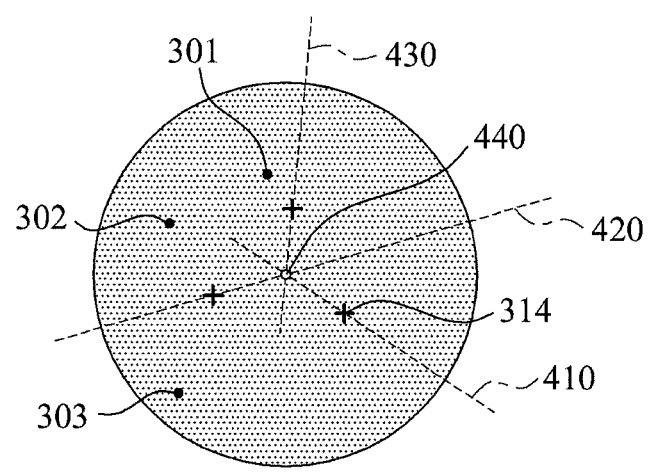
FIG. 4 illustrates a process of calculating a center point of an input object from an intersecting point of 3D bidirectional flows extracted through the process of FIG. 3 according to example embodiments.

FIG. 4 illustrates a process of obtaining a center point of an input object from an intersecting point of 3D bidirectional flows extracted through the process of FIG. 3 according to example embodiments.

The volumetric center density calculator 120 of the image processing apparatus 100 may determine, as a 3D volumetric center point of the input object, an intersecting point 440 of a plurality of 3D bidirectional flows 410, 420, and 430 that are obtained through the aforementioned process of FIG. 3.

Even though the intersecting point 440 is determined using three 3D bidirectional flows 410, 420, and 430, the intersecting point 440 may be determined using two 3D bidirectional flows. Also, the interesting point 440 may be determined at least four 3D bidirectional flows. Accordingly, when the center point of the input object is determined using an intersecting point of 3D bidirectional flows, example embodiments may not be limitedly understood.

The volumetric center density calculator 120 may generate a VCD map showing a density distribution of center points.

The VCD map will be further described with reference to FIG. 5.

FIG. 5 illustrates a process of determining a center density mode of an extracted input object according to example embodiments.

When a 2D center density is calculated with respect to a 2D plane, a density distribution SSD(x, y) at a position (x, y) may be expressed by Equation 4:

$$SSD(x,y)=D(x,y)\cdot G(l,l)$$ [Equation 4]

In Equation 4, D(x, y) corresponds to a center point distribution, and G(l, l) corresponds to a Gaussian kernel.

Graphs of FIG. 5 may be understood as an example of a VCD map generated by the volumetric center density calculator 120.

A distribution of center points, for example, a 3D center point distribution is indicated on spatial coordinates.

When the distribution of center points is used, a 3D VCD map may be generated through the same process of Equation 4 and be expressed by Equation 5:

$$VCD(x,y,z)=D(x,y,z)\cdot G(l,l,l)$$ [Equation 5]

A value of a VCD map at a position (x, y, z) corresponds to a value obtained by applying a Gaussian kernel to a 3D center point distribution at (x, y, z).

In FIG. 5, with respect to a density distribution of points, a left graph shows a single statistical distribution, and a right graph shows two statistical distributions.

In this example, the density mode determiner 130 of the image processing apparatus 100 may determine a density mode as a single mode with respect to a VCD map of the left graph, and may determine the density mode as a dual mode with respect to a VCD map of the right graph.

When the density mode is determined as the single mode, the object characteristic determiner 140 may determine the input object as a spherical shape. When the density mode is determined as the dual mode, the object characteristic determiner 140 may determine the input object as an elliptical shape.

The object characteristic determiner 140 may perform object characterization. The above process corresponds to a process of analyzing an object characteristic by finding a center point of a sphere, or by determining two foci and major axes or minor axes of an ellipsoid.

Figure 6:
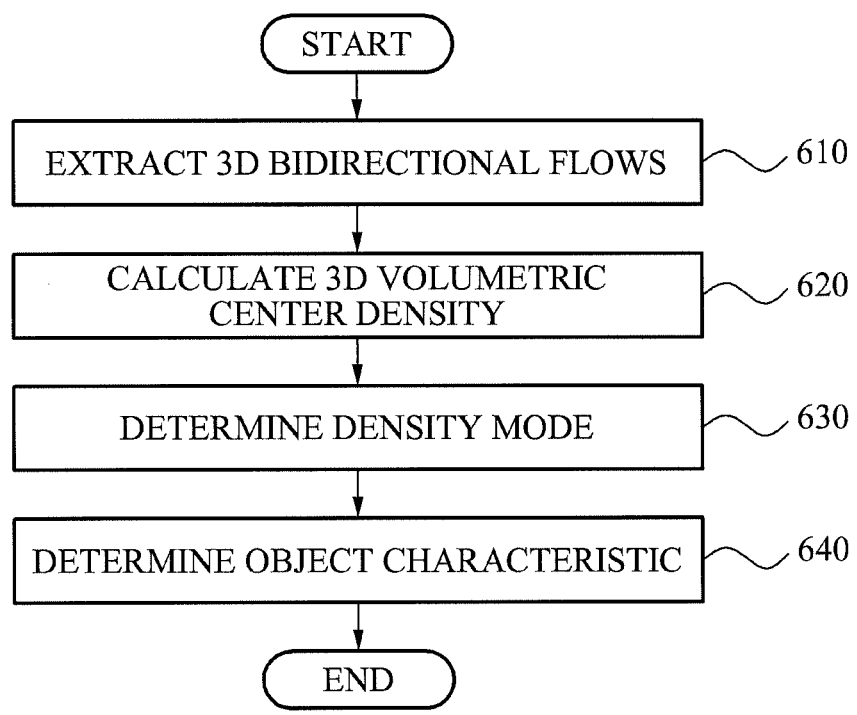
FIG. 6 illustrates an image processing method according to example embodiments.

FIG. 6 illustrates an image processing method according to example embodiments.

In operation 610, the bidirectional flow extractor 110 may extract a plurality of 3D bidirectional flows with respect to an input object. A process of extracting the plurality of 3D bidirectional flows in operation 610 is described above with reference to FIG. 2 and FIG. 3, and will be further described with reference to FIG. 7.

In operation 620, the volumetric center density calculator 120 may determine intersecting points of the extracted 3D bidirectional flows as volumetric center points, using the extracted 3D bidirectional flows, and may express a density distribution of the volumetric center points as a VCD map.

In operation 630, the density mode determiner 130 may determine whether the input object has a volumetric density distribution of a single mode or a volumetric density distribution of a dual mode, based on the above density distribution. This process is described above with reference to FIG. 5 and will be further described with reference to FIG. 8.

In operation 640, the object characteristic determiner 140 may characterize the input object by determining an object characteristic based on the determined density mode. For example, in the case of a sphere, a position of a center point and the like may be determined. In the case of an ellipsoid, foci and major axes and/or minor axes may be determined.

Figure 7:
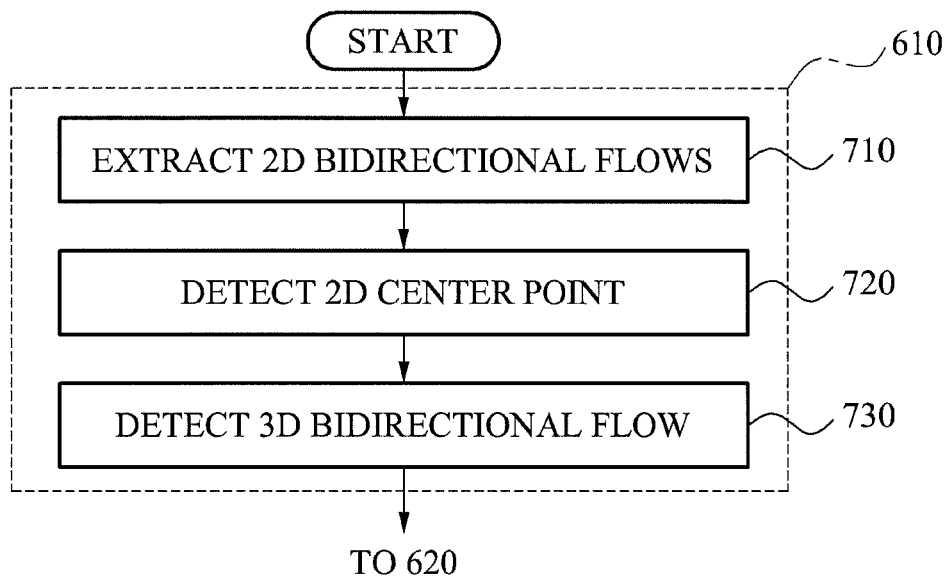
FIG. 7 illustrates a process of extracting a 3D bidirectional flow in the image processing method of FIG. 6 according to example embodiments.

FIG. 7 illustrates a process of extracting a 3D bidirectional flow in the image processing method of FIG. 6 according to example embodiments.

When a 3D or 2.5D object is input, the bidirectional flow extractor 110 may analyze a slice of the input object that is cut by a plane crossing two points in operation 710.

In the above process, the aforementioned 2D bidirectional flow detection process of FIG. 2 may be performed using phase analysis and frequency domain analysis.

In operation 720, the bidirectional flow extractor 110 may detect a 2D center point with respect to the slice. In operation 730, the bidirectional flow extractor 110 may detect, as a 3D bidirectional flow, a perpendicular line crossing the 2D center point.

Figure 8:
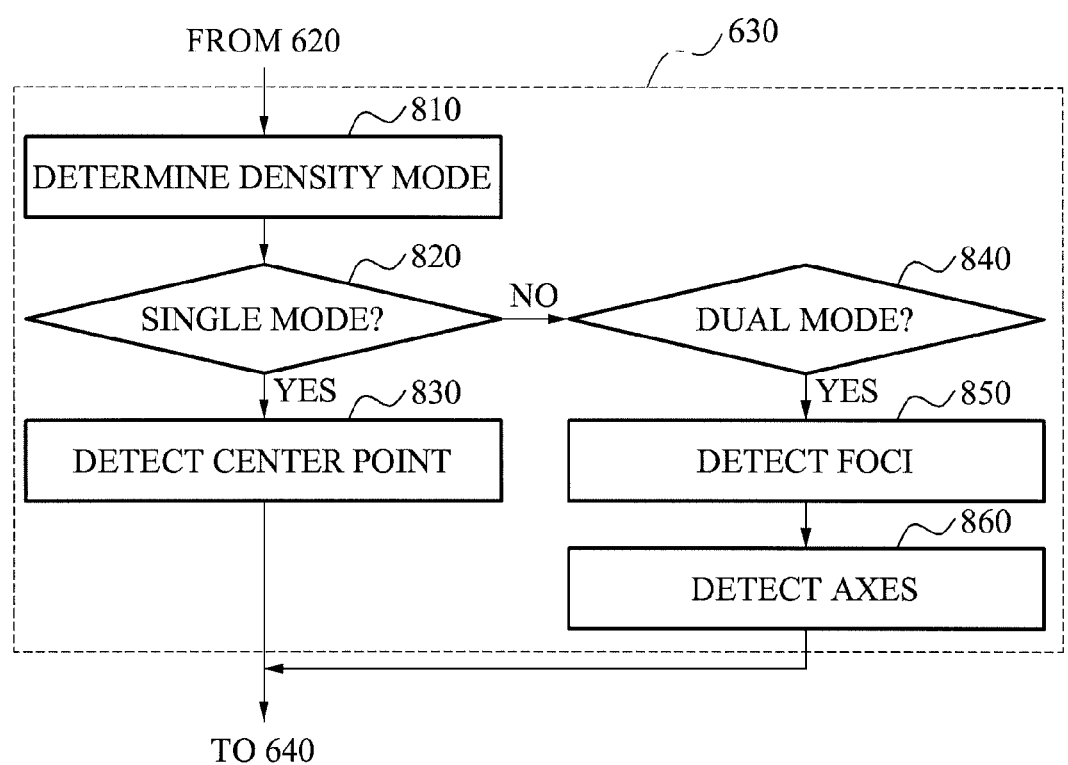
FIG. 8 illustrates a process of determining a density mode of an input object in the image processing method of FIG. 6 according to example embodiments.

FIG. 8 illustrates a process of determining a density mode of an input object in the image processing method of FIG. 6 according to example embodiments.

In operation 810, the density mode determiner 130 may determine the density mode of the input object by referring to a VCD map.

When the density mode is determined as a single mode in operation 820, the object characteristic determiner 140 may detect a center point of a sphere in operation 830.

When the density mode is determined as a double mode in operation 840, the object characteristic determiner 140 may detect foci and axes of an elliptical object in operations 850 and 860.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
    a bidirectional flow extractor to extract at least two three-dimensional (3D) bidirectional flows by detecting at least two perpendicular lines perpendicularly crossing each at least two-dimensional (2D) center points of each at least two slices of an input object; and
    a volumetric center density calculator to calculate a 3D volumetric center density of the input object based on an intersecting point of the extracted at least two 3D bidirectional flows.

2. The image processing apparatus of claim 1, wherein the bidirectional flow extractor extracts a two-dimensional (2D) bidirectional flow from each of at least two planes among a plurality of planes dividing the input object, with respect to the data of the input object, and extracts the 3D bidirectional flow of the input object using the 2D bidirectional flow.

3. The image processing apparatus of claim 2, wherein the bidirectional flow extractor extracts the 2D bidirectional flow by performing a polar transform with respect to at least two points, with respect to each of the at least two planes, and by performing a phase analysis on a polar transformed plane.

4. The image processing apparatus of claim 3, wherein the phase analysis corresponds to a phase analysis using an angular discrete Fourier transform (DFT) scheme.

5. The image processing apparatus of claim 2, wherein the bidirectional flow extractor extracts, as the 3D bidirectional flow, a straight light perpendicularly crossing an intersecting point of extracted 2D bidirectional flows.

6. The image processing apparatus of claim 1, wherein the volumetric center density calculator determines an interesting point of extracted 3D bidirectional flows as a center point of the input object, and calculates a volumetric center density using the center point to generate a volumetric center density map.

7. The image processing apparatus of claim 1, further comprising:
    a density mode determiner to determine a density mode by analyzing the 3D volumetric center density of the input object.

8. The image processing apparatus of claim 7, wherein the density mode comprises information regarding whether a distribution of the 3D volumetric center density corresponds to a signal mode or a dual mode.

9. The image processing apparatus of claim 7, further comprising:
    an object characteristic determiner to determine a characteristic of the input object based on the density mode.

10. The image processing apparatus of claim 9, wherein:
    when a distribution of the 3D volumetric center density corresponds to a single mode, the object characteristic determiner determines the input object as a spherical shape to analyze a center point of a sphere as an object parameter, and
    when the distribution of the 3D volumetric center density corresponds to a dual mode, the object characteristic determiner determines the input object as an elliptical shape to analyze two foci and major axes as object parameters.

11. An image processing method, comprising:
    extracting at least two three-dimensional (3D) bidirectional flows by detecting at least two perpendicular lines perpendicularly crossing each at least two-dimensional (2D) center point of each at least two slices of an input object; and
    calculating a 3D volumetric center density of the input object based on an intersecting point of the extracted at least two 3D bidirectional flows.

12. The image processing method of claim 11, wherein the extracting comprises extracting a two-dimensional (2D) bidirectional flow from each of at least two planes among a plurality of planes dividing the input object, with respect to the data of the input object, and extracting the 3D bidirectional flow of the input object using the 2D bidirectional flow.

13. The image processing method of claim 12, wherein the extracting comprises extracting the 2D bidirectional flow by performing a polar transform with respect to at least two points, with respect to each of the at least two planes, and by performing a phase analysis on a polar transformed plane.

14. The image processing method of claim 13, wherein the phase analysis corresponds to a phase analysis using an angular discrete Fourier transform (DFT) scheme.

15. The image processing method of claim 12, wherein the extracting comprises extracting, as the 3D bidirectional flow, a straight light perpendicularly crossing an intersecting point of extracted 2D bidirectional flows.

16. The image processing method of claim 11, wherein the calculating comprises determining an interesting point of extracted 3D bidirectional flows as a center point of the input object, and calculating a volumetric center density using the center point to generate a volumetric center density map.

17. The image processing method of claim 11, further comprising:
   determining a density mode by analyzing the 3D volumetric center density of the input object.

18. The image processing method of claim 17, wherein the determined mode is a single or dual mode.

19. The image processing mode of claim 11, further comprising:
   determining a characteristic of the input object based on the density calculated 3-D volumetric center.

20. The image processing method of claim 17, further comprising:
   determining a characteristic of the input object based on the density mode.

21. The image processing method of claim 20, wherein the determining comprises:
   determining the input object as a spherical shape to analyze a center point of a sphere as an object parameter when a distribution of the 3D volumetric center density corresponds to a single mode; and
   determining the input object as an elliptical shape to analyze two foci and major axes as object parameters when the distribution of the 3D volumetric center density corresponds to a dual mode.

22. A non-transitory computer-readable recording medium storing a program to implement an image processing method, comprising:
   extracting at least two three-dimensional (3D) bidirectional flows by detecting at least two perpendicular lines perpendicularly crossing each at least two 2D center points of each at least two slices of an input object; and
   calculating a 3D volumetric center density of the input object based on an intersecting point of the 3D extracted at least two bidirectional flows.

* * * * *